United States Patent [19]

Best et al.

[11] Patent Number: 5,510,164
[45] Date of Patent: Apr. 23, 1996

[54] SINGLE-SIDED ABLATIVE WORM OPTICAL DISK WITH MULTILAYER PROTECTIVE COATING

[75] Inventors: Margaret E. Best, San Jose; Paul B. Comita, Menlo Park; Kurt A. Rubin, Santa Clara; Takao Suzuki, San Jose; Wade W. C. Tang, San Jose; Yu-Sze Yen, San Jose, all of Calif.

[73] Assignee: International Business Machines Corporation, Armonk, N.Y.

[21] Appl. No.: 358,135

[22] Filed: Dec. 16, 1994

[51] Int. Cl.⁶ ........................................ B32B 3/00
[52] U.S. Cl. ............... 428/641; 428/642; 428/644; 428/645; 428/913; 430/495.1; 430/945; 430/270.11; 369/283; 369/288
[58] Field of Search ................... 428/64.1, 64.2, 428/64.4, 64.5, 913; 430/270, 495, 945; 369/283, 288

[56] References Cited

U.S. PATENT DOCUMENTS

| | | | |
|---|---|---|---|
| 4,101,907 | 7/1978 | Bell et al. | 346/135 |
| 4,839,207 | 6/1989 | Yoshitomi et al. | 428/64 |
| 4,906,498 | 3/1990 | Ichikawa | 428/64.1 |
| 4,908,250 | 3/1990 | Gotoh | 428/64.1 |
| 4,981,743 | 1/1991 | Ho | 428/64.1 |
| 4,990,387 | 2/1991 | Ohkawa | 428/64.1 |
| 5,102,708 | 4/1992 | Matsubara | 428/64.1 |

FOREIGN PATENT DOCUMENTS

| | | | |
|---|---|---|---|
| 63-261549 | 10/1988 | Japan | G11B 7/24 |
| 3-272032 | 12/1991 | Japan | G11B 7/24 |
| 5-325262 | 12/1993 | Japan | G11B 7/24 |

OTHER PUBLICATIONS

W. L. Holstein et al., "Mechanism of Laser Writing for Optical Data Storage in an Overcoated Tellurium Alloy Trilayer", Journal of Applied Physics, vol. 60, No. 8, 15 Oct. 1986, pp. 2938–2943.

Primary Examiner—Patrick J. Ryan
Assistant Examiner—Elizabeth Evans
Attorney, Agent, or Firm—Thomas R. Berthold

[57] ABSTRACT

A single-sided ablative write-once optical disk is usable without a protective cartridge. The disk includes the conventional radiation-transparent polycarbonate substrate that has one surface serving as the disk outer face and an opposite surface that supports the fluorinated hydrocarbon subbing layer and the tellurium-based active data layer. The tellurium alloy in the data layer flows to form holes when subjected to incident laser radiation through the substrate. A multilayer protective coating is formed over the tellurium-based layer and has an outer surface that serves as the other outer face for the disk. The multilayer protective coating includes a deformable layer formed directly on the tellurium-based layer and a scratch-resistant hardcoat formed on the deformable layer. The deformable layer has sufficient hardness and modulus of elasticity to permit the tellurium alloy to flow at conventional laser power levels. In one embodiment the deformable layer is a silicone elastomer. In another embodiment the deformable layer is a fluorinated hydrocarbon, and a metal layer, such as an aluminum-chromium alloy, is formed between the deformable layer and the hardcoat.

10 Claims, 4 Drawing Sheets

SINGLE-SIDED ABLATIVE WORM OPTICAL DISK WITH MULTILAYER PROTECTIVE COATING

TECHNICAL FIELD

This invention relates to ablative optical disks for use in Write-Once Read-Many (WORM) optical disk data storage systems.

BACKGROUND OF THE INVENTION

Optical disk data storage systems enable the storage of great quantities of data on a disk. The data is accessed by focusing a laser beam onto the data layer of the disk and then detecting the reflected light beam. The data is represented by changes in reflectivity.

An ablative WORM system allows the user to write data by making holes in the data layer of a blank optical disk. Once the data is recorded on the disk it cannot be erased. In an ablative WORM disk, the data layer is a thermally-sensitive, tellurium-based film that is coated on a glass or plastic substrate. The laser radiation enters from the back side of the substrate, passes through the substrate and heats the data layer. The tellurium-based material softens and the molten metal flows to form a hole. The holes typically represent the one bits in digitally-coded data, with the spaces between the holes representing the zero bits.

Commercially available ablative WORM disks are double-sided with two substrates bonded together, mounted on a metal hub and retained within a plastic cartridge. The two substrates are oriented with their respective tellurium-based data layers facing each other and separated by a substantially sealed air gap in the interior of the bonded structure. This form of disk construction protects the sensitive tellurium-based data layers from scratching during handling. Also, because there is no outer layer over the data layers to restrict the molten flow of the tellurium-based material, less laser power is required to ablate the data layers.

There are several disadvantages with this type of disk. There is only one laser and optical head assembly in ablative WORM optical disk drives. Because the disk can only be made in a way that is double-sided, the cartridge must be removed from the drive, turned over and reinserted into the drive to read or write data on both data layers. If used in an optical disk library the library must have a flipper mechanism to turn the disk cartridge over. This adds expense, complexity and size to the library. In stand-alone, non-library applications, the extra thickness of the disk and its cartridge also makes it more difficult to make a low profile optical disk drive, which is desirable for reduced cost and weight.

What is needed is a single-sided ablative WORM disk that does not need a separate protective cartridge, that can be handled without damage to the sensitive tellurium-based data layer, and yet can be easily written to at normal laser power.

SUMMARY OF THE INVENTION

The invention is a single-sided ablative write-once optical disk usable without a protective cartridge. The disk includes a conventional radiation-transparent polycarbonate substrate that has one surface serving as the disk outer face and an opposite surface that supports a fluorinated hydrocarbon subbing layer and the tellurium-based active data layer. The tellurium alloy in the data layer flows to form holes when subjected to incident laser radiation through the substrate. A multilayer protective coating is formed over the tellurium-based layer and has an outer surface that serves as the other outer face for the disk. The multilayer protective coating includes a deformable layer formed directly on the tellurium-based layer and a scratch-resistant hardcoat formed on the deformable layer. The deformable layer has sufficient hardness and modulus of elasticity to permit the tellurium alloy to flow at conventional laser power levels. In one embodiment the deformable layer is a silicone elastomer. In another embodiment the deformable layer is a fluorinated hydrocarbon, and a metal layer, such as an aluminum-chromium alloy, is formed between the deformable layer and the hardcoat.

For a fuller understanding of the nature and advantages of the present invention, reference should be made to the following detailed description taken in conjunction with the accompanying figures.

DESCRIPTION OF THE PREFERRED EMBODIMENTS

Embodiment 1

There are two conflicting requirements for an operable single-sided ablative WORM disk with a tellurium-based active data layer. Because the data layer is extremely sensitive to the environment, it must be protected by a very hard, scratch-resistant layer. At the same time, the laser power required to write by ablation of the data layer must remain within the limits of lasers presently used in optical disk drives. In the preferred embodiment of the present invention, these two requirements are satisfied by a multi-layer protective coating. The composite coating comprises a first "soft" or deformable layer adjacent the active data layer, and a second "hard" scratch-resistant layer applied on top of the first soft layer. In this way, the desired mechanical properties of each layer in the multilayer protective coating can be individually tuned.

Figure 1:
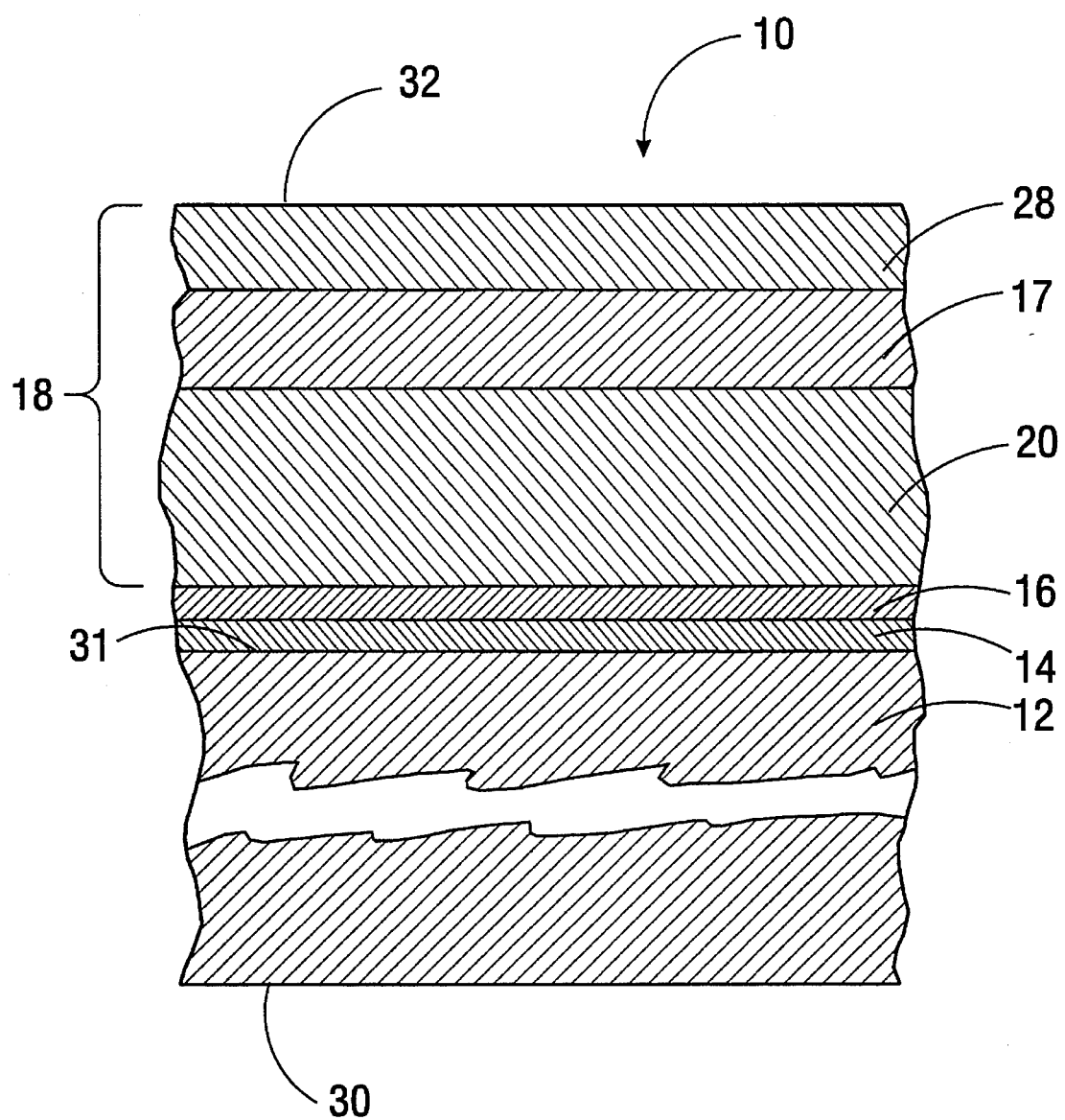
FIG. 1 is a sectional view of the preferred embodiment (embodiment 1) of the single-sided ablative WORM optical disk according to the present invention.

The preferred embodiment of the single-sided ablative WORM disk according to the present invention is shown as item 10 in FIG. 1. The disk 10 comprises a polycarbonate disk substrate 12, a fluorinated hydrocarbon subbing layer or underlayer 14, a tellurium-based active recording layer 16 formed on the underlayer 14, and a multilayer protective coating 18. When located in the optical disk drive, the laser light is incident from the face 30 of substrate 12.

The substrate 12, underlayer 14, and active layer 16 are identical to the structure used to form the conventional double-sided ablative WORM disk. The underlayer 14 is formed on the surface 31 of substrate 12 that is opposite to the surface 30 from which the laser light is incident. Two such structures in the conventional double-sided system are bonded together with the active layers 16 facing each other but separated from each other and supported in a substantially sealed air gap. This double-sided disk structure is then retained within a plastic cartridge. In this manner the tellurium-based active layers are not exposed to the external environment and thus not susceptible to scratching or abrasion from handling.

In the present invention, the protective coating 18 enables the disk 10 to function as a single-sided ablative WORM disk without sealing the tellurium-based active layer and without the use of a plastic cartridge. The coating 18 comprises a deformable layer 20, a hardcoat layer 17, and a label 28.

The deformable layer 20 is made of conformal ultraviolet (UV) radiation curable silicone elastomer and is spin-coated onto the active layer 16 to a thickness in the range of 5 to 300 microns. In the preferred embodiment the material used for layer 20 is a UV radiation curable elastomer, Loctite® brand #5290 available from Loctite Corporation. Alternatively, a moisture cured silicone conforming elastomer, such as Unicoat® brand #S-7001 available form Grave Specialty Polymers, may be used. The purpose of the deformable layer 20 in the region near active layer 16 is to undergo a deformation in response to heating by the focused laser beam. This deformation is principally elastic, but some plastic deformation may also occur. The deformable layer 20 is soft to enable the active layer to push it aside when the active layer is ablated by the laser radiation. This property of deformable layer 20 is required to allow the tellurium-based material in the active layer 16 to flow and leave holes when struck by the laser beam. For this deformation to occur readily near the interface with the active layer 16, the hardness of the deforming layer should be quite low. If the deformable layer 20 is too hard then excessive laser power will be required to cause the active layer to ablate. Values of hardness less than 100 as measured on the Shore A scale are acceptable. The Shore A test is described by American Society for Testing and Materials (ASTM) D2240 and uses a durometer which is a type of indenter to measure the ease of producing an indention at a specified load. The durometer device is described in *Handbook of Plastics Testing Technology*, V. Shah, John Wiley, 1984, p. 81.

The silicone elastomers have the advantage of being extremely inert and able to withstand high temperatures without chemical breakdown. In addition, they can be applied in liquid form by spin coating and then cured using UV light. The additional advantage of the spin-coated silicone elastomer deformable layer is that it is also relatively inexpensive to manufacture and is compatible with the manufacturing process as used for existing ablative WORM disks.

Examples of types of materials that can function as the deformable layer, and their known hardness and elasticity modulus values, are listed in the table below. All of these types of materials include both low hardness versions and/or low modulus of elasticity versions. Hence they are all applicable for deformation by elastic, plastic or combination of the two methods. The tensile modulus of elasticity in psi is determined by ASTM Test #638 described in the previously cited Shah reference.

| MATERIAL | ASTM D2240 SHORE A VALUE | ASTM 638 TENSILE MODULUS (PSI) |
|---|---|---|
| Thermoplastic elastomer | 35–100 | 100–2200 |
| Silicone | 25–90 | 100–1500 |
| Polyacrylate | 40–90 | 100–1500 |
| Fluorocarbon | 65–90 | 200–2000 |
| Ethylene propylene | 30–90 | 100–3000 |
| Polyurethane | 65–80 | 25–5000 |

The scratch-resistant hardcoat layer 17 is formed over the deformable layer 20. This can be done in several ways. One approach is to glue a sheet of plastic on top of the deformable layer 20 layer with a hot melt glue or a pressure sensitive glue. The plastic material can be polyester or polycarbonate, and can be glued to layer 20 with pressure-sensitive type glue, such as Scotchmark® brand #200 high performance acrylic adhesive or #300 high strength acrylic adhesive, both available from 3M Corporation. The hardcoat layer 17 provides protection from mechanical abrasion or scratching. Other materials such as UV-curable spin-coated acrylate can also function as the hardcoat layer 17.

A label 28 for writing or graphics is then attached to hardcoat layer 17. The label 28 is backed with an adhesive for permanent attachment to the hardcoat layer 17. The label 28 can be any imprintable layer (e.g. paper, polyester) for graphics or handwriting. The adhesive should be permanent, easy to apply, and noncorrosive to the hardcoat layer 17 and the active layer 16. The label 28 may be Scotchmark brand product 7745 or the 468 series, which are available from 3M Corporation. Both the hardcoat layer 17 and the label 28 together should provide protection to the active layer 16 from mechanical abrasion, scratching, and handwriting and yet provide a surface for graphics and labeling. If the graphics are silkscreened or otherwise printed directly on the hardcoat layer 17, particularly if the hardcoat layer 17 is a plastic sheet layer, the label 28 can be eliminated.

In a specific experiment, data was recorded on an experimental disk at the same linear density and recording speed used with conventional 625MB/surface optical WORM disks. The experimental single-sided WORM disk was produced by spin coating 100 microns of Loctite® #5290 onto an uncoated conventional ablative WORM disk. The uncoated disk had a 1.2 mm thick grooved polycarbonate disk coated with 200 Å $CF_x$ which was coated with 250 Å TeSeF active data layer. The Loctite® #5290 was irradiated with UV light for 2 minutes under nitrogen, causing the liquid to cure and polymerize into a flexible elastomer. The disk was then spun on a dynamic test stand. Laser radiation of 780 nm was focused through a 0.55 numerical aperture lens. At 7.5 m/s media speed, the laser power required to write was 22 mW, when 20 ns long laser pulses were used to record pulse position modulation (PPM) data with a 57 ns clock and (2,7) run-length limited code. This is only 70% more power than required by the unprotected TeSeF data layer. This power is quite reasonable and well within the capabilities of lasers used in commercially available optical disk drives.

Figure 2A:
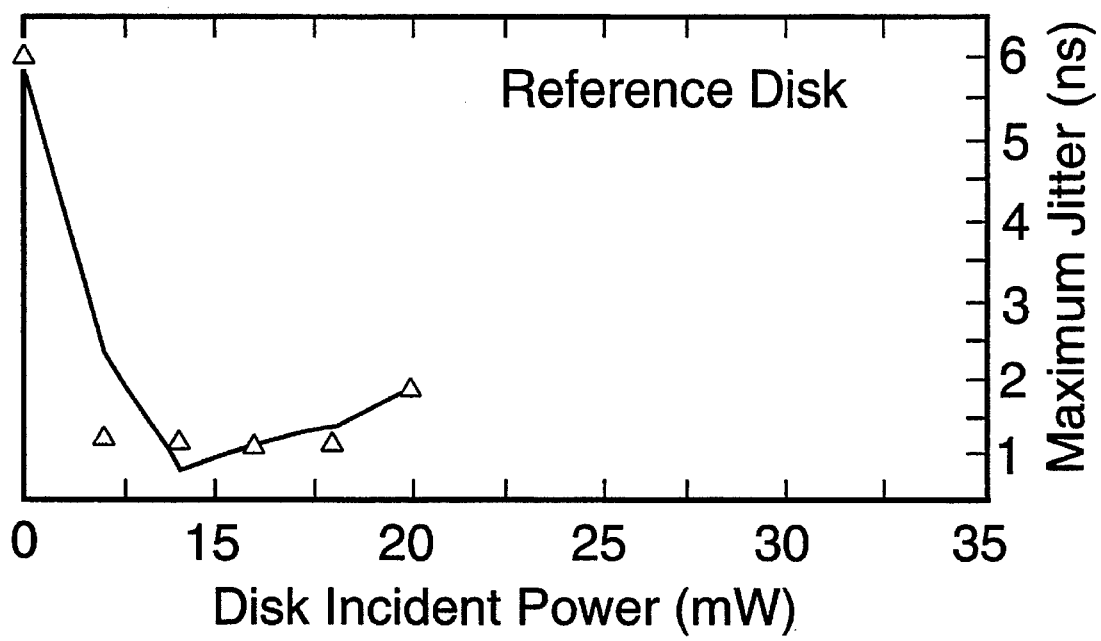
FIG. 2A is a graph showing jitter data as a function of disk incident laser power for a conventional ablative WORM disk.
Figure 2B:
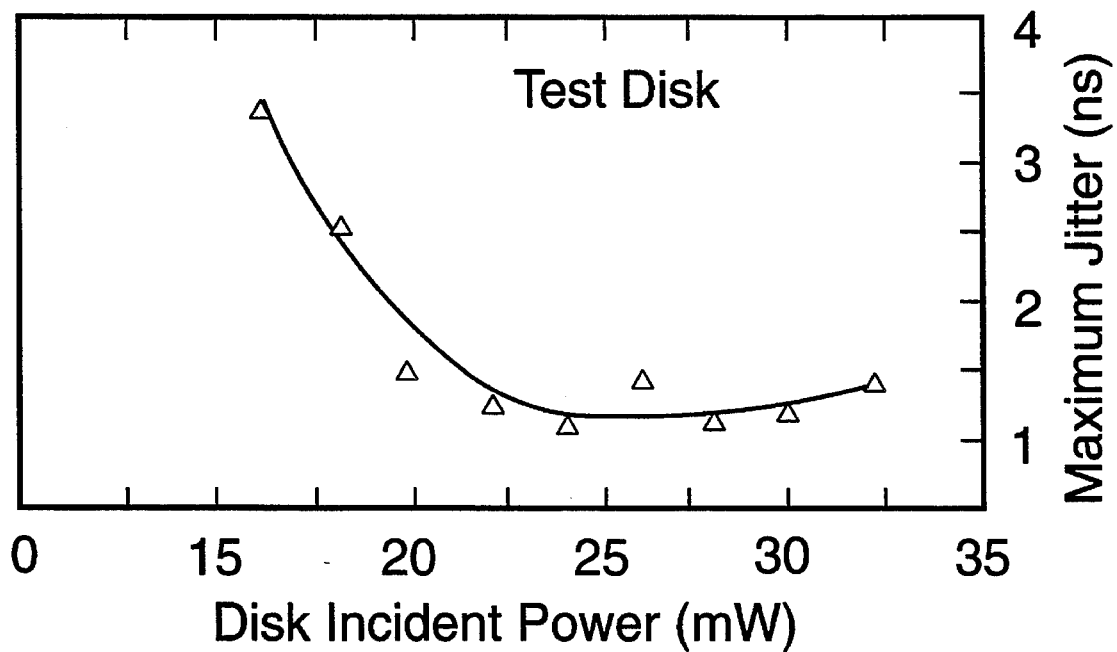
FIG. 2B is a graph showing jitter data as a function of disk incident laser power for the single-sided ablative WORM disk according to the present invention for comparison with the data of FIG. 2A.

The written data exhibited low "jitter" upon readback. Jitter is a measure of the deviation of the mark transitions from their ideal locations on the disk. Low jitter is important to ensure that data is read back with minimal errors. The worst case readback jitter was measured to be 1.25 ns, which is much less than required to make a commercially feasible disk. It is desirable to have the worst case jitter be less than five percent of the clock time, which would be 2.85 ns in this case of a 57 ns clock. A value of 1.25 ns is less than half of that so there is ample margin for the observed jitter. The measured jitter data is shown in FIGS. 2A–2B. Thus, these test results demonstrate that the presence of the soft deformable layer 20 does not preclude good quality recording on a single-sided ablative WORM disk.

Embodiment 2

Figure 3:
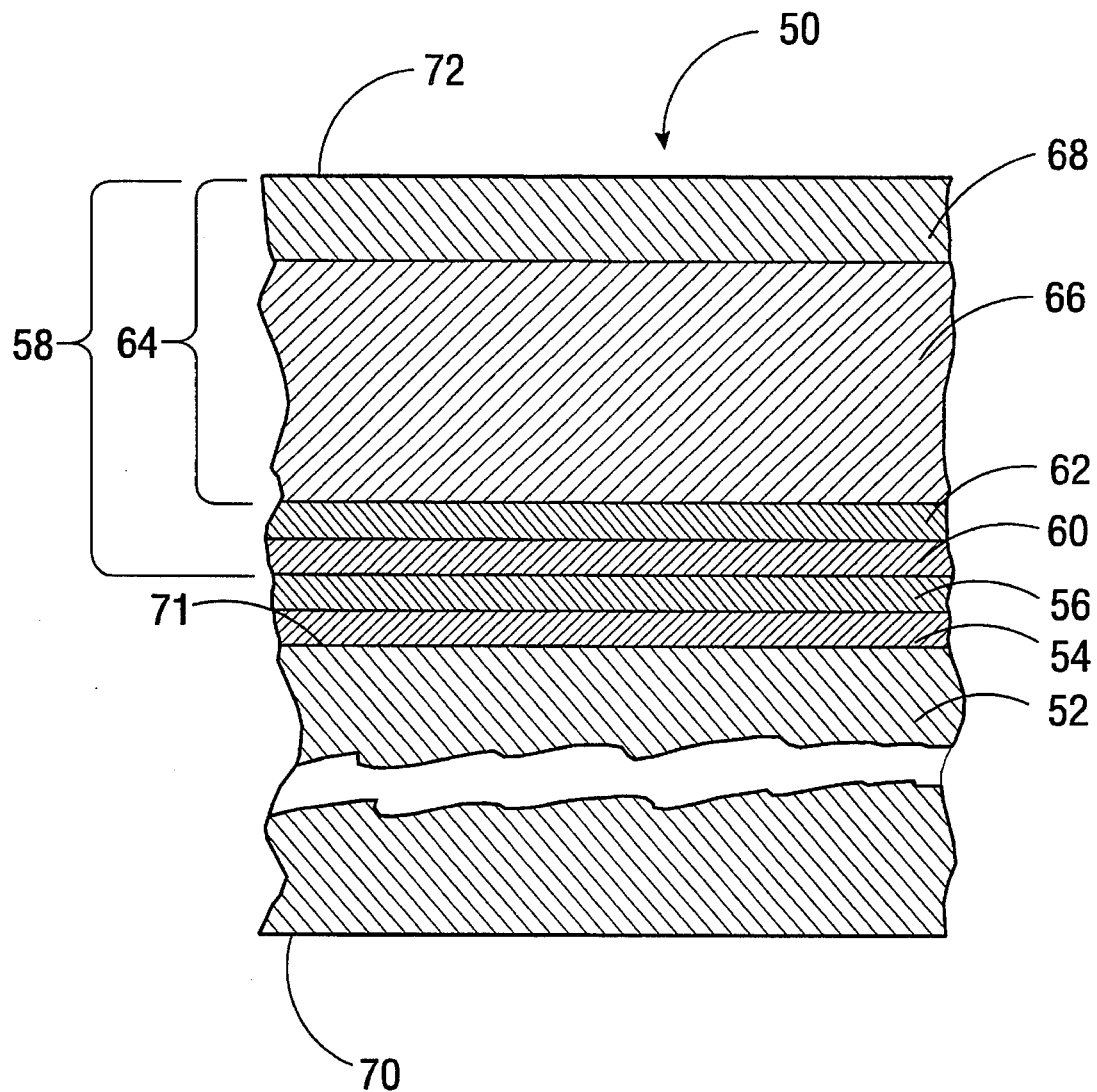
FIG. 3 is a sectional view of an alternative embodiment (embodiment 2) of the single-sided ablative WORM optical disk according to the present invention.

Embodiment 2 of the single-sided ablative WORM disk according to the present invention is shown as item 50 in FIG. 3. The disk 50 comprises a polycarbonate disk substrate 52, a fluorinated hydrocarbon underlayer 54, a tellurium-based active recording layer 56 formed on the underlayer 54, and a multilayer protective coating 58. When located in the optical disk drive, the laser light is incident from the face 70 of substrate 52.

As for embodiment 1, the substrate 52, underlayer 54, and active layer 56 are identical to the structure used to form the conventional double-sided ablative WORM disks.

In embodiment 2 of the present invention, the protective coating 58 includes a deformable layer 60 formed directly on the active layer 56, a metal layer 62 formed on the deformable layer 60, and a protective overcoat 64 formed directly on the metal layer 62. In the preferred embodiment, the deformable layer 60 is formed of the same or similar material as the fluorinated hydrocarbon subbing layer or underlayer 54. The purpose of the deformable layer 60 is to undergo a deformation in response to heating by the focused laser beam. This deformation is principally plastic but can be a mixture of plastic and elastic. This property of layer 60 is required to allow the tellurium-based material in the active layer 56 to flow and leave holes when struck by the laser beam. Other materials besides fluorinated hydrocarbons can be used for layer 60 if they have low yield strengths.

The metal layer 62 formed over the deformable layer 60 is preferably formed of a corrosion resistant aluminum alloy. The metal layer 62 dissipates the stress associated with applying the antiscratch hardcoat layer 66 to prevent its delamination from the deforming layer 60. An example of an aluminum alloy is $Al_{(100-x)}Cr_x$, where x is typically 3. Other metal layers, such as aluminum, gold, or gold alloys, can also be used. Other Al or Au alloys formed with one or more of Ni, Pt, and Fe are also usable as the metal layer 62.

The overcoat 64 formed over metal layer 62 is provided by two components, a hard antiscratch layer 66 and a label 68 for writing or graphics. The "hardcoat" is typically a spin-coated UV-curable acrylate that provides protection from mechanical abrasion or scratching. An example is Silitec II, available from Dainippon Ink & Chemicals Company. The label 68 is backed with an adhesive for permanent attachment to the hardcoat layer 26. The label 68 can be any imprintable layer (e.g. paper, polyester) for graphics or handwriting. The adhesive should be permanent, easy to apply, and noncorrosive to the hardcoat layer 66 and the active layer 56. Both the hardcoat layer 66 and the label 68 together should provide protection to the active layer 56 from mechanical abrasion, scratching, and handwriting and yet provide a surface for graphics and labeling. If the graphics are silkscreened or otherwise printed directly on the hardcoat, the label 68 can be eliminated.

The disk 50 is fabricated in the following manner. The substrate 52 is preferably injected-molded polycarbonate. The plasma-polymerized $CF_x$ film 54 is deposited with a conventional process using a capacitively-coupled, coplanar RF (13.56 MHz) diode reactor system. The term $CF_x$ is used to represent the stoichiometry of the plasma polymerized fluorocarbon film 54 where x generally has a value less than or equal to 4. The sputtering target is polytetrafluoroethylene (PTFE). A tetrafluoroethylene ($C_2F_4$)/Argon gas mixture is injected into the discharge system at a total flow rate of 20 sccm. The approximate flow ratio is 1:1 $C_2F_4$:Ar (i.e., 10 sccm $C_2F_4$ and 10 sccm Ar). The chamber pressure is independently controlled by a throttle valve to a value of 20 mTorr (2.67 Pa). The polymer film is deposited at a constant DC bias voltage of 50 V at the target. The thickness of the underlayer 54 is typically 150–300 Å.

A recording layer 56 of TeSeF is next sputter deposited onto the $CF_x$ layer 54 using a known prior art process, such as that described in U.S. Pat. No. 4,839,207. The recording layer 56 is formed by sputtering from a Te—Se alloy target with a sputtering gas of a combination of selenium fluoride ($SeF_4$) and Argon. The total gas pressure is typically 3 mTorr. The $SeF_4$ gas contributes both Se and F to the recording layer. The thickness of recording layer 56 is typically 200–300 Å.

A layer 60 of $CF_y$ is then plasma deposited on top of the recording layer 56 using the same process described above for the $CF_x$ underlayer 54. The term $CF_y$ is meant to represent the stoichiometry of the plasma polymerized fluorocarbon film 60 where y generally has a value between 1 and 4. (Note that y can have a different value than x in layer 54). The thickness of layer 60 is chosen to give the desired optical and recording properties. A typical value is 500–2000 Å. A thickness of approximately 200 Å can be used but a higher laser recording power will be required. A thicker value of 500–2000 Å is preferred since the metal layer 62 placed on top of the $CF_y$ layer will mechanically constrain the plastic deformation of the $CF_y$ during laser writing if it is too close physically to the TeSeF data layer 56. By making the $CF_y$ layer thicker, the $CF_y$ layer can accommodate more of the deformation induced by the laser writing rather than requiring that the metal layer 62 also be suject to elastic or plastic deformation. It takes much more force to cause the metal layer to deform than the $CF_y$ layer since the yield strength of the $CF_y$ is so low.

The metal layer 62 of $Al_{97}Cr_3$ alloy is DC sputter deposited on the $CF_y$ layer 60 in an Ar atmosphere of 3 mTorr pressure. The aluminum alloy film thickness is typically 300–1000 Å.

A liquid polymer of UV radiation curable acrylate, such as Daicure Clear #SD-211, available from Dainippon Ink & Chemicals Company, is then spin-coated on top of the metal layer 62 to serve as the hardcoat layer 66. The polymer is cured under UV light to yield a very hard antiscratch coating. The thickness of the hardcoat layer 66 is typically 5–50 microns.

A label 68 is then applied to the hardcoat layer 66. The label may be a Scotchmark® product #7745 or #468 series available from 3M Corporation. The label is a polyester layer upon which graphics has already been printed. The label is backed with an adhesive that adheres at room temperature to the hardcoat layer 66. The label is rolled on to the hardcoat layer 66 starting at one edge of the disk. A roller is passed over the label to ensure that it adheres uniformly to the hardcoat layer. Alternatively the printing or graphics can be screen printed directly on the hardcoat layer 66.

The completed disk 50 thus has a first outer face 70 from which the laser light is incident, which is one side of the disk substrate 52, and a second opposite outer face 72, which is the label 68. The underlayer 54 is formed on the first surface 71 of the substrate 52, with the opposite surface 70 of substrate 52 forming the first outer face of the completed disk 50.

Dynamic testing for carrier-to-noise ratio (CNR) of a test disk with a $CF_y$ layer 60 and a metal layer 62 was performed using a Nakamichi brand OMS2000 tester which has a laser operating at 830 nm and a 0.52 numerical aperture objective lens. In one set of tests, the disk performance was compared to a conventional ablative WORM disk. The test disk was operated at 2400 rpm at 50 mm radius. The laser was pulsed at media speeds of 7.5 m/s. The laser power was modulated to produce a series of short laser pulses of 65 ns duration and 203 ns period. The test results for the disk are represented by the X marks in FIG. 4 and are compared with the diamond marks for the reference disk. The overcoat structure on the tellurium-based active layer of the single-sided test disk was:

1000Å CFy deformable layer/
500Å Al metal layer/
25 micron thick Scotchmark ® #200 acrylic adhesive/
64 micron thick polyester 468MS label.

Figure 4:
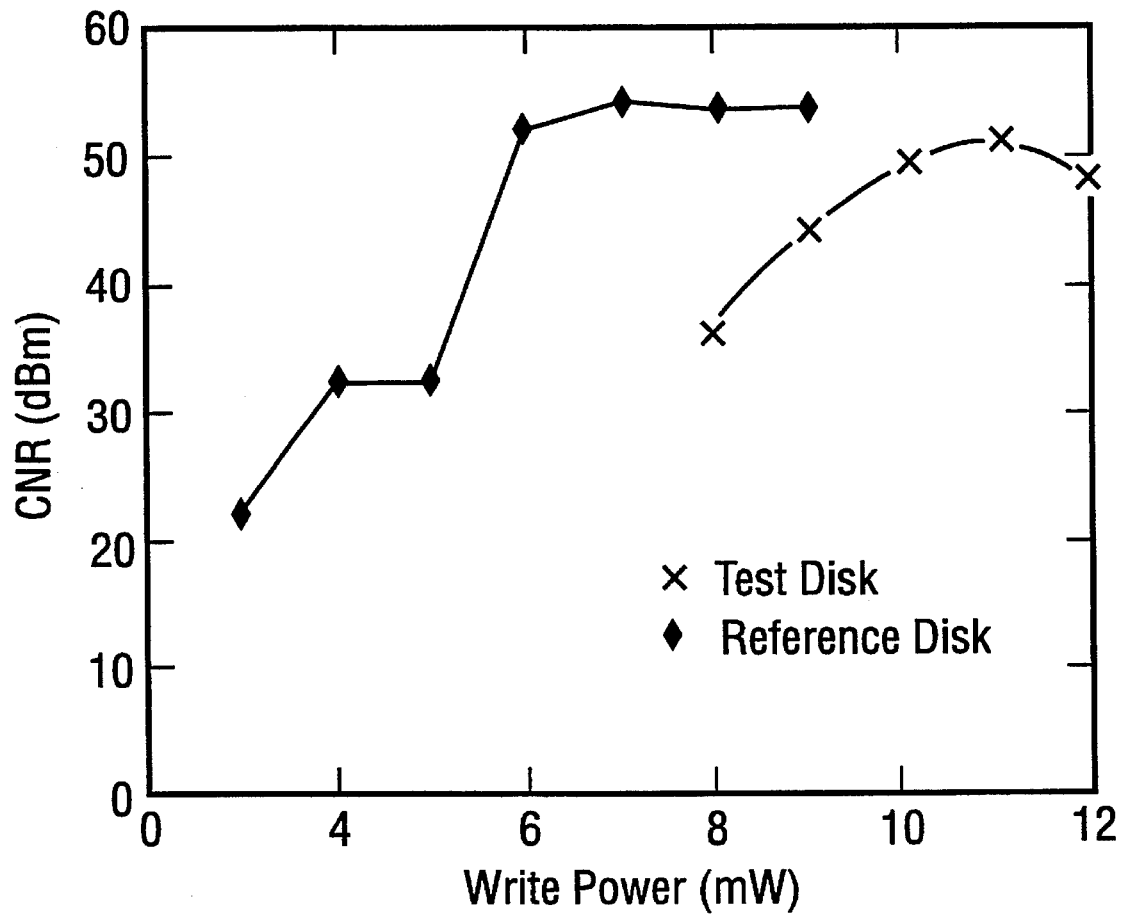
FIG. 4 is a graph showing carrier-to-noise ratio (CNR) data as a function of disk incident laser power for writing on the disk of embodiment 2.

This disk exhibited a carrier to noise ratio (CNR) of 48 db using a laser power of 10 mW. While this is higher than the laser power of 6.5 mW required for writing to the conventional double-sided reference disk with an intermediate air gap, it is an acceptable power level. By comparison, the data represented by diamonds in FIG. 4 is the reference disk of a standard ablative WORM disk, i.e., essentially substrate 52, underlayer 54, and tellurium-based active layer 56, with no protective coating.

While in the present invention the fluorinated hydrocarbon has been used as the deformable layer 60 in contact with the active layer 56, alternative layers are possible. The "giving" of the deformable layer can be either in some form of combination of plastic deformation and/or delamination (as in the case of the fluorinated hydrocarbon), or as an elastic deformation. In the latter case, there are a number of materials that may be used that undergo elastic deformation and that may function in the same manner as the fluorinated hydrocarbon. If the silicone elastomer or other material which undergoes elastic deformation is used for the deformable layer 60, then the protective overcoat 64 can be a spin-coated UV curable acrylate which may be applied directly on the silicone elastomer without the need for a metal layer 62.

When the deformable layer 60 is used together with the metal layer 62, as in embodiment 2 in FIG. 3, the thickness of the deformable layer 60 is specified based on consideration of the optical interference required to achieve the best performance. The optical interference effects are calculated using standard thin film interference calculations, as described in *Optical Properties of Thin Solid Films*, O. H. Heavens, Academic Press, 1955. An example of the absorption of the disk structure constituting embodiment 2 is where the index of refractions for the materials are 1.58 for the polycarbonate substrate 52, 1.38 for the $CF_x$ underlayer 54, 3.3+3.5 i for the TeSeF active layer 56, 1.38 for the $CF_y$ deformable layer 60, and 2.87+8.6 i for the Al metal layer 62. The optimal thickness of the deformable layer 60 is where the absorption is highest, since this results in lowest laser writing power. In this example this optimal thickness occurs for a thickness of the $CF_y$ layer 60 between 500–2000 Å. In addition, higher order thickness values that are within a range of the lower and upper optimal values plus $\lambda/2$ n multiples (e.g., $500+\lambda/2$ n to $2000+\lambda/2$ n in this example), where $\lambda$ is the wavelength of the light and n is the index of refraction of the deformable layer, will have identically high absorption. If the optical properties of the materials are different, then the optimal thickness values would be different, but the procedure for optimizing the thickness is the same.

While the preferred embodiments of the present invention have been illustrated in detail, it should be apparent that modifications and improvements may be made to the invention without departing from the spirit and scope of the invention as described in the following claims.

What is claimed is:

1. A single-sided ablative write-once optical disk having a single data layer for use in a laser-based optical disk drive comprising:

a radiation-transparent substrate having a first surface that supports the single data layer and an opposite surface that forms a first outer face of the disk and from which laser radiation enters the substrate;

a fluorinated hydrocarbon film formed on the first surface of the substrate;

a tellurium-based active film formed directly on the fluorinated hydrocarbon film, the active film flowing to form holes in the presence of incident radiation from the laser;

a deformable layer of material having a hardness, as measured on the Shore A scale, of less than 100 and selected from the group consisting of silicone elastomers, polyacrylates, ethylene propylenes, polyurethanes and fluorocarbons, the deformable layer being formed directly on and in contact with the active film and permitting flow of the active film in the presence of incident radiation from the laser; and a protective overcoat formed on the deformable layer, the protective overcoat forming the second outer face of the disk opposite said first outer face and comprising a plastic layer of polyester or polycarbonate bonded to the deformable layer by a layer of adhesive.

2. A single-sided ablative write-once optical disk having a single data layer for use in a laser-based optical disk drive comprising:

a radiation-transparent substrate having a first surface that supports the single data layer and an opposite surface that forms a first outer face of the disk and from which laser radiation enters the substrate;

a fluorinated hydrocarbon film formed on the first surface of the substrate;

a tellurium-based active film formed directly on the fluorinated hydrocarbon film, the active film flowing to form holes in the presence of incident radiation from the laser;

a silicone elastomer deformable layer having a hardness, as measured on the Shore A scale, in the range of approximately 25–90, the deformable layer being formed directly on and in contact with the active film, the 14 deformable layer permitting flow of the active film in the presence of incident radiation from the laser and;

a protective overcoat comprising a layer of a spin-coated ultraviolet-radiation-curable acrylate formed directly on the deformable layer, the protective overcoat forming the second outer face of the disk opposite said first outer face.

3. The disk according to claim 2 wherein the protective overcoat further comprises an imprintable label bonded to the acrylate layer, the label forming the second outer face of the disk.

4. A single-sided ablative write-once optical disk having a single data layer for use in a laser-based optical disk drive comprising:

a radiation-transparent substrate having a first surface that supports the single data layer and an opposite surface that forms a first outer face of the disk and from which laser radiation enters the substrate;

a fluorinated hydrocarbon film formed on the first surface of the substrate;

a tellurium-based active film formed on the fluorinated hydrocarbon film, the active film flowing to form holes in the presence of incident radiation from the laser;

a deformable layer of material selected from the group consisting of fluorinated hydrocarbons and silicone elastomers formed directly on and in contact with the active film, the deformable layer permitting flow of the active film in the presence of incident radiation from the laser;

a metal layer formed directly on the deformable layer; and a protective overcoat formed on the metal layer, the protective overcoat forming the second outer face of the disk opposite said first outer face.

5. The disk according to claim 4 wherein the metal layer is formed of aluminum or an aluminum alloy.

6. The disk according to claim 4 wherein the protective overcoat is a layer of hardenable adhesive bonded to the metal layer and a plastic film bonded to the adhesive layer.

7. The disk according to claim 4 wherein the protective overcoat comprises a layer of an ultraviolet-radiation-curable acrylate.

8. The disk according to claim 7 wherein the protective overcoat further comprises a plastic label bonded to the acrylate layer.

9. A single-sided ablative write-once optical disk having a single data layer for use in a laser-based optical disk drive comprising:

a radiation-transparent substrate having a first surface that supports the single data layer and an opposite surface that forms a first outer face of the disk and from which laser radiation enters the substrate;

a fluorinated hydrocarbon film formed on the first surface of the substrate;

a tellurium-based active film formed directly on the fluorinated hydrocarbon film, the active film flowing to form holes in the presence of incident radiation from the laser;

a deformable layer of material having a hardness, as measured on the Shore A scale, of less than 100 and selected from the group consisting of silicone elastomers, polyacrylates, ethylene propylenes, polyurethanes and fluorocarbons, the deformable layer being formed directly on and in contact with the active film and permitting flow of the active film in the presence of incident radiation from the laser; and a protective overcoat comprising an imprintable layer formed on the deformable layer, the label forming the second outer face of the disk opposite said first outer face.

10. A single-sided ablative write-once optical disk having a single data layer for use in a laser-based optical disk drive comprising:

a radiation-transparent substrate having a first surface that supports the single data layer and an opposite surface that forms a first outer face of the disk and from which laser radiation enters the substrate;

a fluorinated hydrocarbon film formed on the first surface of the substrate;

a tellurium-based active film formed directly on the fluorinated hydrocarbon film, the active film flowing to form holes in the presence of incident radiation from the laser;

a deformable layer of material having a hardness, as measured on the Shore A scale, of less than 100 and selected from the group consisting of silicone elastomers, polyacrylates, ethylene propylenes, polyurethanes and fluorocarbons, the deformable layer being formed directly on and in contact with the active film and permitting flow of the active film in the presence of incident radiation from the laser; and a protective overcoat comprising a layer of an ultraviolet-radiation curable acrylate and a plastic label bonded to the acrylate layer, the label forming the second outer face of the disk opposite said first outer face.

* * * * *